(12) United States Patent
Prasad et al.

(10) Patent No.: US 8,089,789 B2
(45) Date of Patent: Jan. 3, 2012

(54) METHOD AND SYSTEM FOR MANAGING UNINTERRUPTABLE POWER SUPPLY FOR HARMONIC REDUCTION

(75) Inventors: Lakshmi Prasad, Andhra Pradesh (IN); Lauro Strozzi, Biasca (CH); Narender Katukuri, Andhra Pradesh (IN); Ivan Saporiti, Riazzino (CH); Krishna Murali Dora, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 563 days.

(21) Appl. No.: 12/265,968

(22) Filed: Nov. 6, 2008

(65) Prior Publication Data

US 2010/0109618 A1    May 6, 2010

(51) Int. Cl.
*H02M 7/08* (2006.01)
(52) U.S. Cl. ......................................................... 363/70

(58) Field of Classification Search .................... 363/67, 363/69, 70
See application file for complete search history.

(56) References Cited

U.S. PATENT DOCUMENTS

| | | | | |
|---|---|---|---|---|
| 4,451,773 | A * | 5/1984 | Papathomas et al. | 320/128 |
| 5,712,779 | A * | 1/1998 | Sheppard et al. | 363/69 |
| 6,549,434 | B2 | 4/2003 | Zhou et al. | |
| 2008/0239771 | A1* | 10/2008 | Wang et al. | 363/44 |
| 2010/0067267 | A1* | 3/2010 | Jagota | 363/69 |
| 2010/0109618 | A1* | 5/2010 | Prasad et al. | 323/234 |

* cited by examiner

*Primary Examiner* — Jeffrey Sterrett
(74) *Attorney, Agent, or Firm* — GE Global Patent Operation; Catherine J. Toppin

(57) ABSTRACT

A method and system for managing a dual rectifier uninterruptable power supply, comprising activating each of said rectifiers to provide an output DC voltage, monitoring a level of operation of the uninterruptable power supply and deactivating a selected one of said dual rectifiers when a level of operation of said two activate rectifiers is less than a first predetermined level of operation.

14 Claims, 5 Drawing Sheets

Simulation Results Showing THD Vs Load

Experimental Results Showing THD Vs. Load

METHOD AND SYSTEM FOR MANAGING UNINTERRUPTABLE POWER SUPPLY FOR HARMONIC REDUCTION

BACKGROUND OF THE INVENTION

Considerable increase in the utilization of electrical energy over the last few years as more electrical equipment is being used or installed by an increasing number of users or customers. Along with the demand for electrical energy, the demand for its quality has also increased. No longer is variation in the voltage level, frequency or phase acceptable. Particularly, in applications such as hospitals, process intensive industries, data centers, etc, the quality of the provided electrical energy is especially important The service quality provided by any electrical equipment is directly driven by the quality of its electrical input. And interruption of the power supply is no longer acceptable.

Uninterruptible Power Supplies (UPS) are well-known in the art to provide a reasonable solution to the prevention of electrical power interruption. Functionally UPSs may be classified as: 1. output voltage and frequency dependant on the main supply (VFD); 2. output voltage is independent of the main supply (VI); and 3. output voltage and frequency is independent of the main supply (VFI).

Among these three configurations, VFI provides the best quality power supply to a load. The VFI feature is achieved by well-known double conversion topology in a UPS. Typically, the double conversion topology, an exemplary configuration is shown in FIG. 1, uses thyristors or diode based rectifiers with a bulk capacitor at the DC output. However, this configuration draws a huge harmonic current from the main supply. These harmonics are measured in terms of a Total Harmonic Distortion (THD). High THD currents pollute the main supply voltage and can lead to malfunction of other equipment connected to the same node.

Hence, a device is needed for managing the power input to reduce the THD currents that are taken by a UPS.

SUMMARY OF THE INVENTION

As described herein, the embodiments of the present invention overcome one or more of the above or other disadvantages known in the art.

One aspect of the present invention relates a method for managing a dual rectifier uninterruptable power supply by managing the operating condition of each of the rectifiers.

Another aspect of the present invention relates to a method of managing input current Total Harmonic Distortion (THD) in an Uninterrupted Power Supply (UPS) consisting of one or more rectifiers operating in parallel Another aspect of the present invention relates to an system for managing a dual rectifier uninterruptable power supply (UPS) by managing the operating condition of each of the rectifiers.

These and other aspects and advantages of the present invention will become apparent from the following detailed description considered in conjunction with the accompanying drawings.

BRIEF DESCRIPTION OF THE DRAWINGS

In the Figures.

It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE PREFERRED EMBODIMENTS OF THE INVENTION

Figure 1:
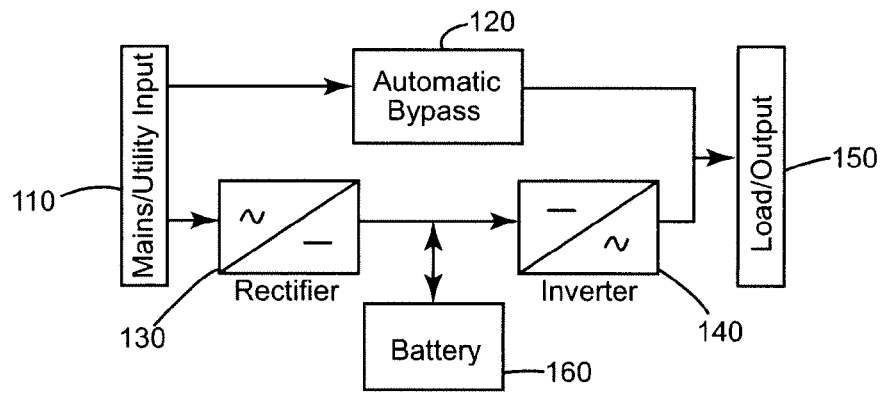
FIG. 1 illustrates a conventional double conversion UPS.

FIG. 1 illustrates a conventional double conversion UPS system receiving power input from Main Utility 110. The power (or electrical) input is provided to rectifier 130, which rectifies the electrical input to a DC voltage. The rectified DC voltage is provided to an inverter 140 that converts the rectified voltage back to an AC. The output of the inverter is provided to load 150. The electrical input is further provided to an automatic bypass 120 that provides electrical power to the load directly, when necessary.

In case of a failure in the electrical power, battery 160 provides a DC voltage to inverter 140 to provide electrical power to load 150.

Figure 2:
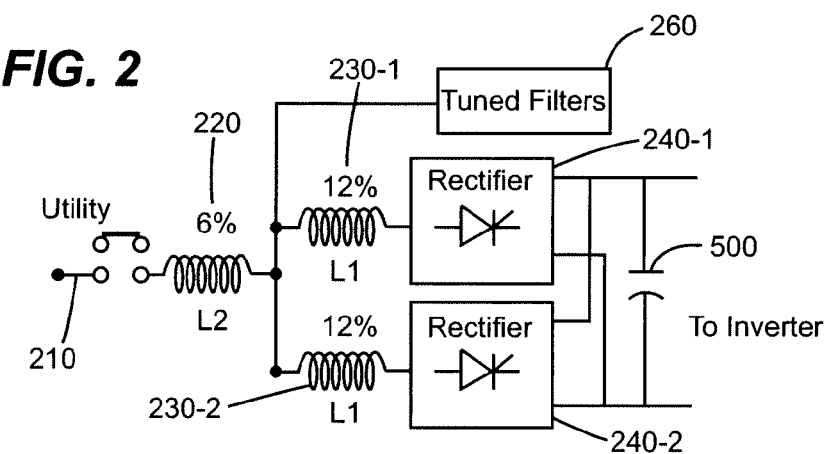
FIG. 2 illustrates a single line diagram of a conventional 6-pulse thyristor rectifier topology using two parallel rectifiers.
Figure 3:
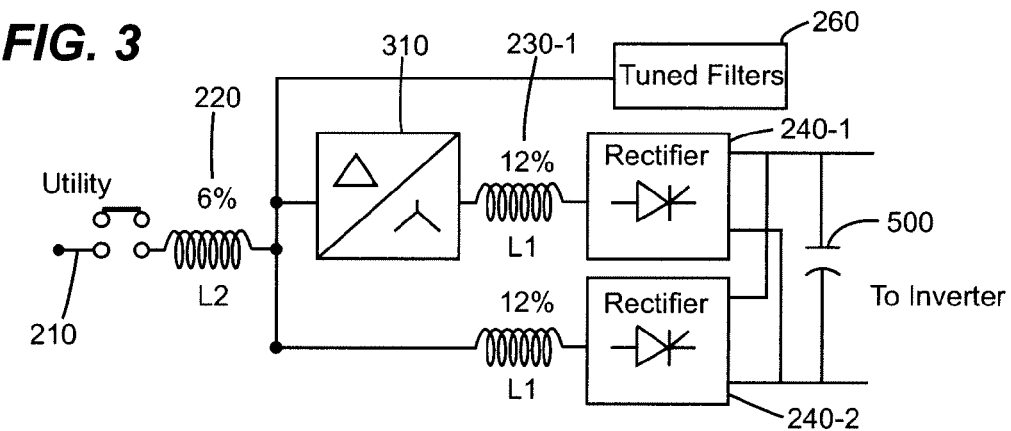
FIG. 3 illustrates a single line diagram of a conventional 12-pulse topology.

As is known in the art, the level of harmonics generated in conventional three phase UPS is much higher in case of 6 pulse topology when compared to 12 pulse topology. FIG. 2 illustrates a single line diagram of a conventional 6 pulse rectifier topology of a UPS (with two parallel rectifiers). FIG. 3 illustrates a single line diagram of a conventional 12-pulse topology of a UPS. Referring to FIG. 2, input power is provided through switched line 210 to inductor 220. The input signal is provided to dual rectifiers 240-1, 240-2 through corresponding inductors 230-1, 230-2. The output of the dual-rectifier UPS is provided across the capacitor 500. FIG. 3 illustrates a 12 pulse rectifier configuration and includes a delta to star transformer 310 in line with one of the rectifiers in parallel. In each case, tuned filters 260 are used to smooth the input signal.

Although it is possible to use a single 6 pulse rectifier in UPS systems, the use of two such rectifiers in parallel facilitates minimal changes between 12 pulse and 6 pulse products. Tuned filters are employed in six pulse configurations to meet desired distortion limits (e.g., 5%). Though tuned filters help in limiting THD at full load to a low value (e.g. below 5%), at fractional loads the THD increases (e.g 15% THD at 50% load). On the other hand a 12 pulse rectifier topology gives lower THD almost constant throughout the load (e.g., 8% without filter and 4% with filter). However, 12 pulse topology is more costly, more bulky and less energy efficient.

Figure 4:
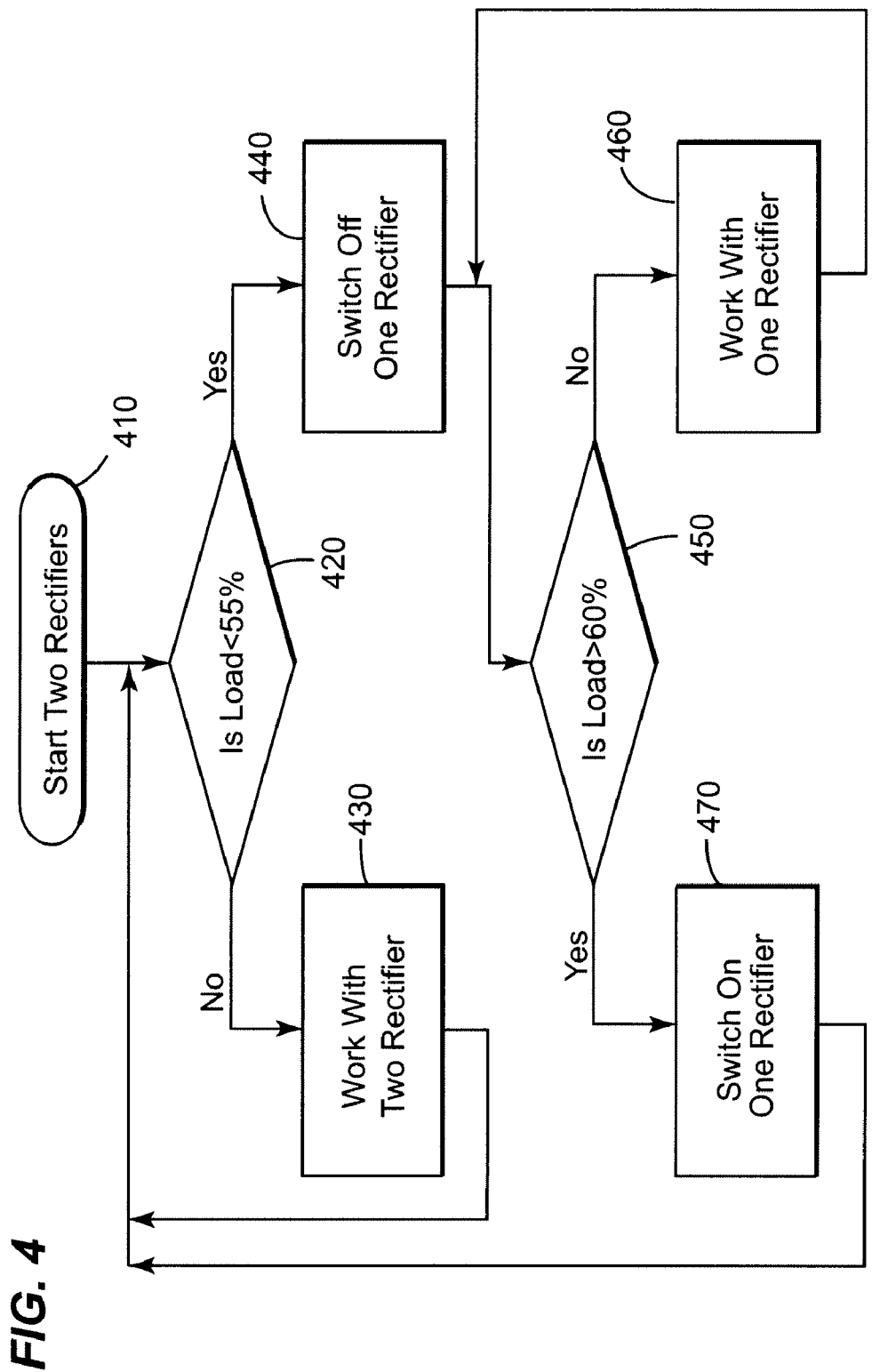
FIG. 4 illustrates a flow chart of a process for managing a UPS to reduce distortion in accordance with the principles of the invention.

FIG. 4 illustrates a flow chart for managing the dual rectifiers in a 6 pulse topology UPS to reduce the total harmonic distortion in accordance with the principles of the invention. FIG. 4 illustrates an example in which, at block 410, both the rectifiers are activated (see FIG. 2). At block 420, a determination is made whether the load on the UPS causes the UPS to operate at less than a first predetermined level of operation. In a preferred embodiment the first predetermined level of operation is set at 55 percent of the rated operation of the UPS. If, at block 420, the level of operation is determined to be greater that the first predetermined level of operation, then both rectifiers are maintained in an "on" condition at block 430 and processing continues to monitor the level of operation of the UPS at block 420

Otherwise, one of the rectifiers is turned "off" at block 440. With the UPS operating on a single rectifier, at block 450, a determination is made whether the load attached to the UPS (now operating on a single rectifier) causes the UPS to operate at greater than a second predetermined level of operation. In a preferred embodiment the second predetermined level of operation is set at 60 percent of a rated operation of the UPS (e.g., 60 percent of the rated Power of the UPS). If the answer, at block 450, is that the UPS is operating at less than a second level of operation, then the UPS operation is maintained using a single rectifier at block 460. Processing continues to monitor the level of operation using a single rectifier at block 450.

However, if the operation of the UPS is determined to be greater than the second predetermined level of operation, then the second rectifier is again turned 'on" at block 470, such that two rectifiers are actively providing electrical energy to the output.

Processing continues to block 420 where the processing continues monitors the operation of the UPS with regard to the first predetermined level, as discussed previously.

Figure 5:
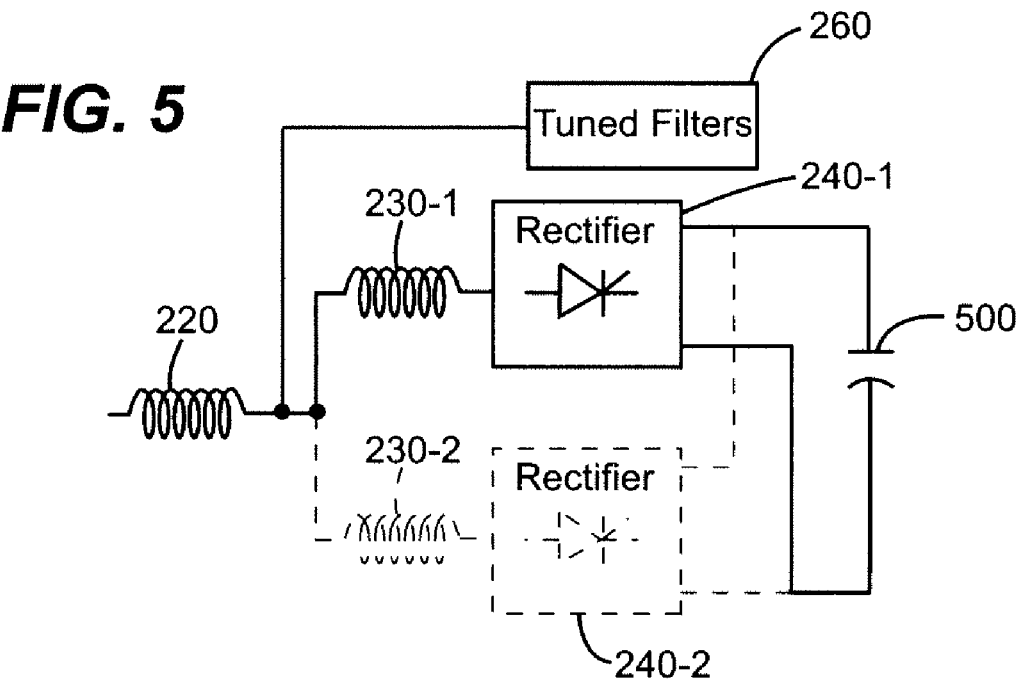
FIG. 5 illustrates a block diagram of one operation of a UPS in accordance with the processing shown in FIG. 4.
Figure 6:
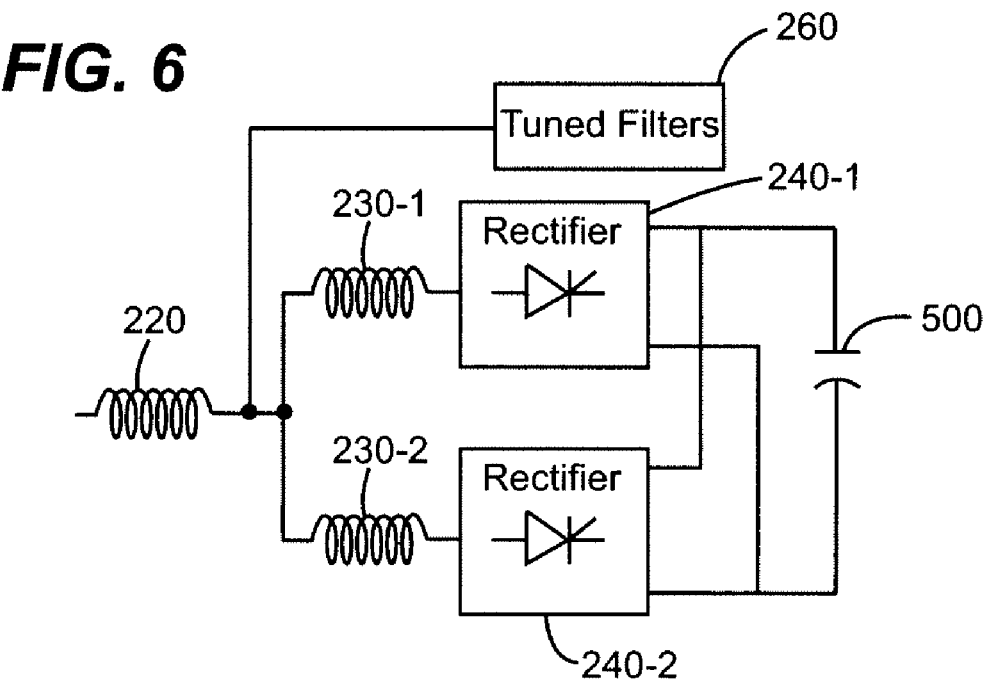
FIG. 6 illustrates a block diagram of a second operation of a UPS in accordance with the processing shown in FIG. 4.

FIGS. 5 and 6 illustrate block diagrams of rectifiers 240-1, 240-2 with corresponding inductors 230-1, 230-2 wherein one rectifier (240-2) is turned off (FIG. 5) and both rectifiers are turned on (FIG. 6). As shown in FIG. 5, when the UPS is operating below a first predetermined level, a single rectifier 240-1 is made operational and the DC Voltage output across the capacitor 500 is maintained by the single rectifier.

FIG. 6 illustrates the condition when both rectifiers 240-1, 240-2 are turned on and the voltage across the capacitor 500 is being maintained by both rectifiers working together in parallel.

Figure 7:
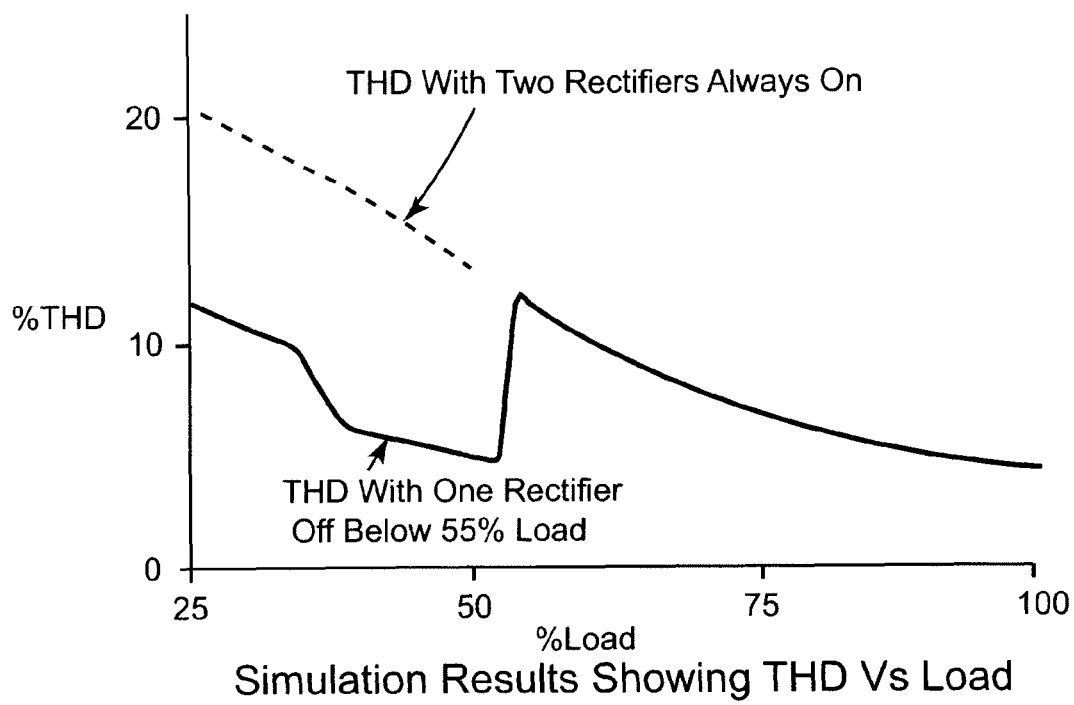
FIG. 7 illustrates a graph of simulation results of distortion and load in accordance with the principles of the invention.

FIG. 7 illustrates simulation results of distortion versus load for a system implementing the processing shown in FIG. 4. As shown, the distortion is significantly less with the operation of a single rectifier (solid line) than the operation with two rectifiers (dashed line) in the region where the load is less than the preferred first level of operation and increase to its nominal distortion value (solid line) when two rectifiers are in operation.

Figure 8:
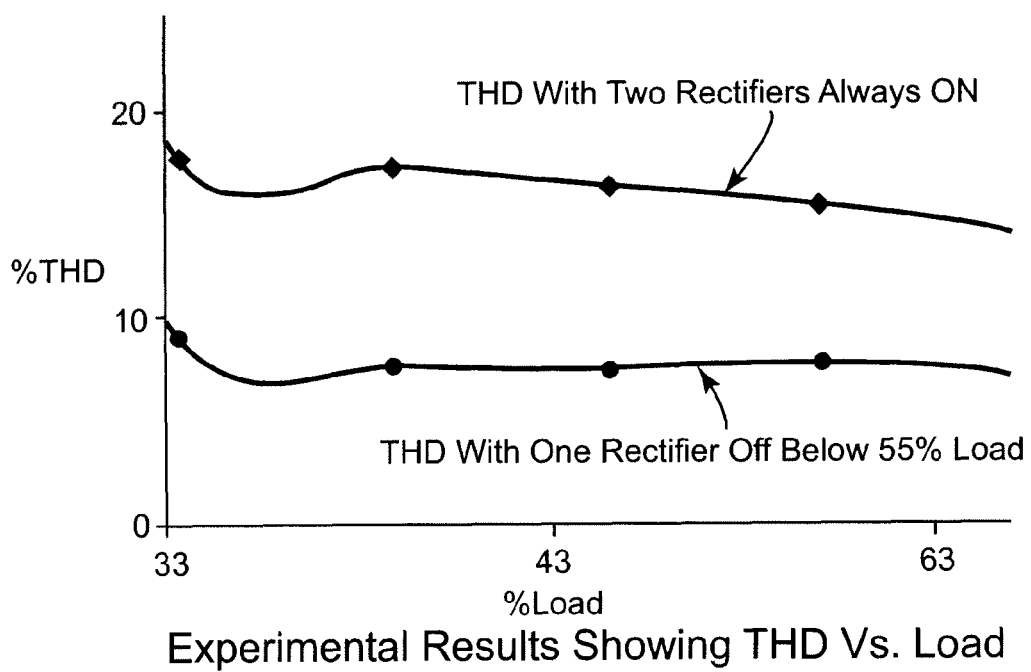
FIG. 8 illustrates a graph of experimental results of distortion and load in accordance with the principles of the invention.

FIG. 8 illustrates experimental results for a UPS implementing the processing shown in FIG. 4. In this illustrated example, the distortion using the principles of the invention is almost half of the distortion using two rectifiers (55% load to 33% load), when the load is below a first predetermined level of operation.

Figure 9:
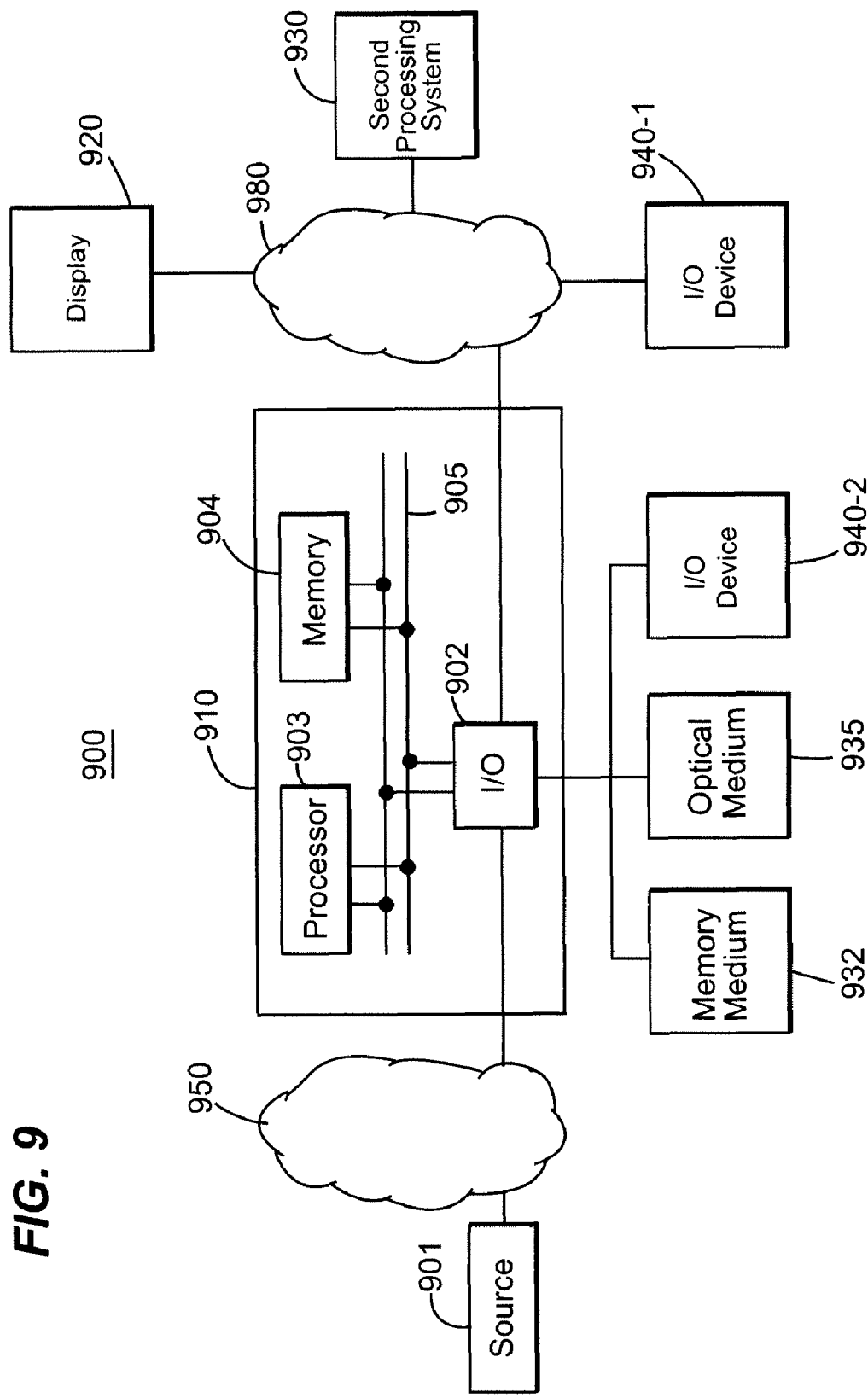
FIG. 9 illustrates a system for implementing the processing shown in FIG. 4.

FIG. 9 shows an exemplary embodiment of a system 900 which may be used for implementing the principles of the present invention. System 900 may represent a set-top box, a desktop, laptop or palmtop computer, a personal digital assistant (PDA), a etc., as well as portions or combinations of these and other devices 910. Device 910 may receive information from one or more sources 901 through one or more input/output devices 902 that provide the information to processor 903 and a memory 904. The source(s) 901 may alternatively provide information through one or more network connections, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks 950.

The input/output devices 902, processor 903 and memory 904 may communicate over a communication medium 905. The communication medium 905 may represent, e.g., a bus, a communication network, one or more internal connections of a circuit, circuit card or other device, as well as portions and combinations of these and other communication media. Information from the source(s) 901 is processed in accordance with one or more software programs stored in memory 904 and executed by processor 903 in order to generate output results, e.g., control signals, to one or more of a display device 920, a second processing system 930, and/or an I/O device 940-1, which may be associated with a system to be controlled. The generated output results may be provided directly to selected ones of the receiving devices or may be provided over a network 980, which may be the same network, the same type of network or a different type of network than that associated with network 950.

In a preferred embodiment, the coding and decoding employing the principles of the present invention may be implemented by computer readable code executed by the system and/or processor 903. The code may be stored in the memory 904 or read/downloaded from a memory medium, such as a semiconductor memory, a CD-ROM or floppy disk 9320, optical medium 935 or via I/O device 940-2 that may be associated with another networks or devices (not shown). In other embodiments, hardware circuitry may be used in place of, or in combination with, software instructions to implement the invention. For example, the elements illustrated herein may also be implemented as discrete hardware elements. In other embodiments the system described herein may be a combination of hardware and software, such as an ASIC (Application Specific Integrated Circuit) or FPGA (Field Programmable Gate Array) or other similar device.

While there has been shown, described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. For example, although the principles of the invention have been described with regard to two rectifies, it would be within the knowledge of those skilled in the art to expand the principles presented herein to include more than two rectifiers operating in parallel. In this case, the concept of maintaining selected number of operating rectifiers based on one or more levels of operation of the UPS has been contemplated and considered to be within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for managing a dual rectifier uninterruptable power, comprising:
    activating each of said dual rectifiers to provide an output DC voltage, wherein each of said dual rectifiers has a six pulse topology and are connected in parallel;
    monitoring a level of operation of the uninterruptable power supply; and
    deactivating a selected one of said dual rectifiers when a level of operation of said dual rectifiers is less than a first predetermined level of operation to increase a line inductance and reduce an input total harmonic distortion (THD).

2. The method of claim 1, wherein said deactivation comprising the step of:
    turning off the selected rectifier.

3. The method of claim 1, further comprising the step of:
    maintaining said dual rectifier operation when said level of operation is less than said first level of operation.

4. The method of claim 1, further comprising the step of:
    maintaining said active dual rectifier operation when said level of operation of a single rectifier is greater than a second predetermined level of operation.

5. A method of managing input current Total Harmonic Distortion (THD) in an Uninterrupted Power Supply (UPS) consisting of one or more rectifiers operating in parallel, said method comprising:
    activating each said rectifiers, wherein each of said dual rectifiers has a six pulse topology;
    monitoring a level of operation said UPS;
    selectively deactivating at least one of said rectifiers when said level of operation less than a first predetermined level and selectively activating at least one of said deactivated rectifiers when said level of operation is greater than a second predetermined level to increase a line inductance and reduce the THD, wherein the first predetermined level of operation is a percentage of a load.

6. The method of claim 5, wherein said deactivating comprises turning off said selected rectifier.

7. The method of claim 5, wherein said activating comprises turning on said selected rectifier.

8. A system for managing a dual rectifier uninterruptable power supply (UPS), comprising:
    a processor in communication with a memory, said memory including code which when accessed by the processor causes the processor to:
    activate each of said dual rectifiers to provide an output DC voltage, wherein each of said dual rectifiers has a six pulse topology and are connected in parallel;
    monitor a level of operation of the uninterruptable power supply providing an output DC voltage;
    deactivate a selected one of said dual rectifiers when a level of operation of said dual rectifiers is less than a first predetermined level of operation to increase a line inductance and reduce an input total harmonic distortion (THD), and activate selected ones of said deactivated rectifier when said level of operation is greater than a second predetermined level of operation.

9. The system of claim 8, wherein said deactivation comprising the step of:
    turning off the selected rectifier.

10. The system of claim 8, further comprising:
    maintaining said dual rectifier operation when said level of operation is less than said first level of operation.

11. The system of claim 8, wherein said first predetermined level of operation is set at known percentage a rated power output of said UPS.

12. The system of claim 11, wherein said known percentage is 55 percent.

13. The system of claim 8, wherein said second predetermined level of operation is set at known percentage a rated power output of said UPS.

14. The system of claim 13, wherein said known percentage is 60 percent.

* * * * *